UNITED STATES PATENT OFFICE.

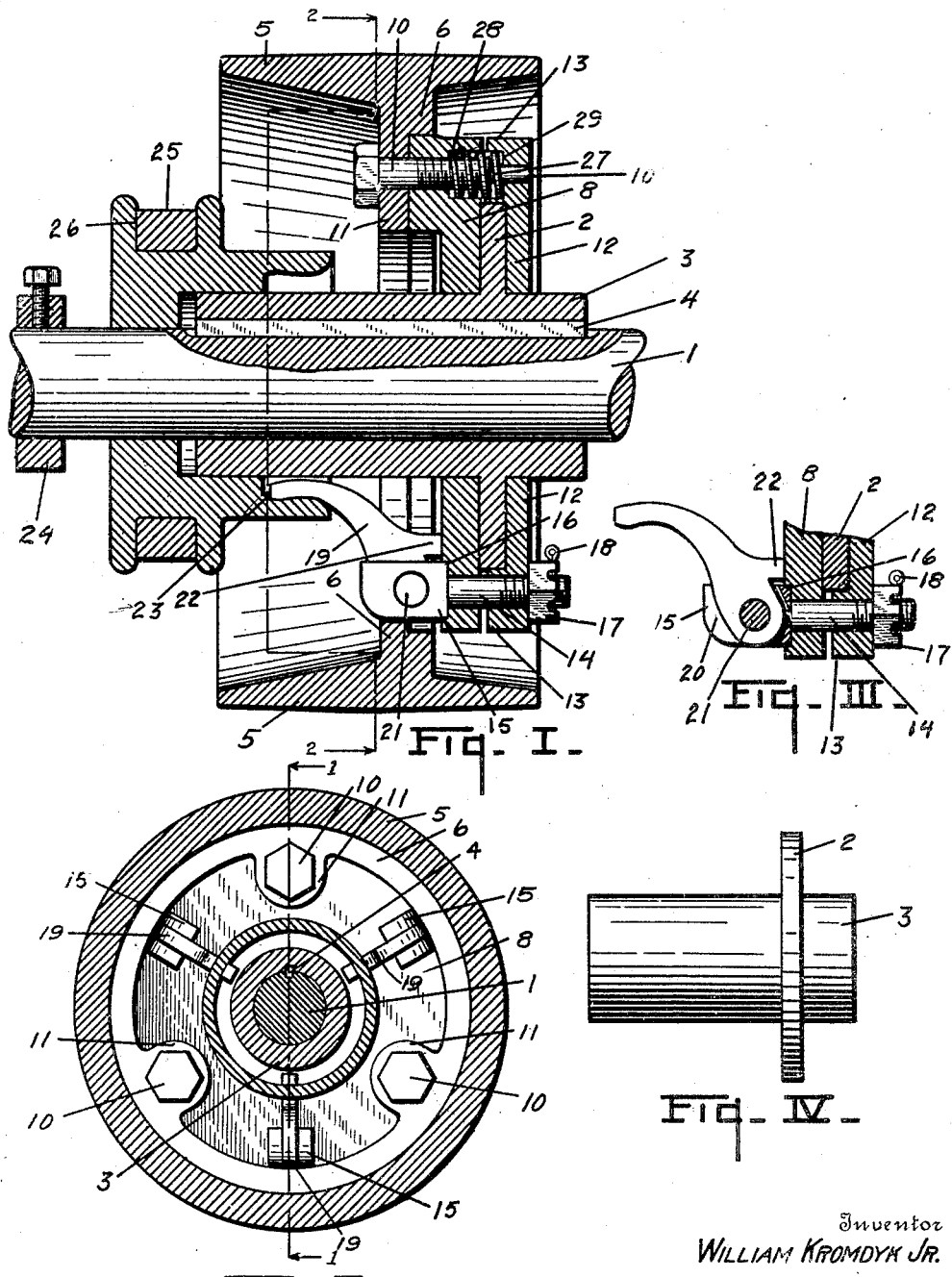

WILLIAM KROMDYK, JR., OF PORTAGE, MICHIGAN.

FRICTION-CLUTCH.

1,203,013.   Specification of Letters Patent.   Patented Oct. 31, 1916.

Application filed January 7, 1915. Serial No. 985.

*To all whom it may concern:*

Be it known that I, WILLIAM KROMDYK, Jr., a citizen of the United States, residing at the township of Portage, in the county of Kalamazoo and State of Michigan, have invented certain new and useful Improvements in Friction-Clutches, of which the following is a specification.

This invention relates to improvements in friction clutches.

The main objects of this invention are to provide an improved friction clutch which is simple and compact in structure and one which at the same time is powerful and durable.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a detail longitudinal section of a structure embodying the features of my invention taken on a line corresponding to line 1—1 of Fig. II. Fig. II is a transverse section taken on a line corresponding to the broken line 2—2 of Fig. I. Fig. III is an enlarged detail section showing the mounting of the actuating levers on the clamping bolts. Fig. IV is an elevation of the driving clutch member.

In the drawing, similar reference characters refer to similar parts throughout the several views, and the sectional views are taken looking in the direction of the little arrows at the ends of the section lines.

Referring to the drawing, 1 represents the driving shaft. The driving clutch disk 2 is provided with a sleeve-like hub 3 which is fixed to the shaft by means of the key 4. The pulley 5 is provided with an internal annular rib 6 having an annular shoulder therein provided with a seat for the inner driven clutch member 8. This inner clutch member 8 has boss-like projections arranged in the seat. The inner clutch member is secured to the pulley by the screws 10 arranged through the inwardly projecting lugs 11 on the rib 6. The inner driven disk member 8 coacts with the inner side of the driving disk 2 and is rotatably mounted upon the hub thereof. The outer driven clutch member 12 is rotatable upon the hub 3 of the driving clutch disk to coact with the outer side thereof and is provided with an inwardly projecting flange 13 embracing the periphery of the driving disk. The clamping bolts 14 are arranged through the outer and inner driven clutch members with their heads 15 on the inner side of the inner member. The inner member is provided with seats 16 for the clamping bolt heads, the seats being squared to receive the square heads thus preventing the turning of the clamping bolts. The clamping bolts are provided with adjusting nuts 17 which are retained in their adjusted position by the keys 18.

The clamping levers 19 are arranged in the slots 20 in the heads of the clamping bolts, the levers being mounted on the pivots 21. The levers are provided with lug-like fulcrums 22 engaging the inner sides of the inner clutch member. The levers are curved inwardly so that their inner ends lie close to the hub-like sleeve 3 and are embraced by the actuating sleeve or collar 23 which is slidably mounted on the driving shaft and on the hub 3. A stop collar 24 is provided for the actuating sleeve. The actuating sleeve in the structure illustrated is shifted by means of a forked shifting lever 25, the fork engaging the groove 26 in the sleeve. The shifting lever other than its fork is not shown as levers of this character are well understood in the art.

To insure the prompt disengagement of the clutch members I provide the springs 27. These springs are arranged in seats 28 in the inner clutch member 8 and the opposing seats 29 in the outer clutch member 12, the seats 29 being counterbores in the holes for the screws 10. The screws 10 are provided with reduced ends 10' which engage suitable holes in the member 12 with a sliding fit so that the screws serve as supports for the member.

With the parts thus arranged the clutch is engaged by shifting the actuating sleeve inwardly which forces the ends of the levers inward and clamps both the inner and outer driven clutch member upon the driving clutch member 2, pressure being applied through the clamping bolt and fulcrum for the levers. When the clamping sleeve is shifted outwardly the levers are released and the driven clutch members are freed and are positively separated by the coiled springs as described.

My improved clutch is simple and compact in structure and is at the same time very powerful and durable in use.

Having thus described my invention, what I claim as new and desire to secure by Letters Patent, is:

1. In a clutch, the combination of a driving shaft, a driving clutch disk provided with a sleeve-like hub fixed to said shaft, a pulley having an internal annular shouldered rib provided with inwardly projecting lugs, an inner driven clutch member seated in said shoulder of said rib and rotatably mounted on said hub to coact with said driving clutch disk, screws for securing said inner driven clutch member to said pulley arranged through said inwardly projecting lugs and threaded into said inner driven clutch member, said screws having reduced ends, the inner ends of the screw holes being counterbored to provide spring seats, an outer driven clutch member rotatably mounted on said hub to coact with said driving clutch member and having an annular inwardly projecting flange embracing the edge thereof, said flange having spring seats therein disposed oppositely to said spring seats of said inner driven clutch member, and holes with which said reduced ends of said screws engage, coiled springs arranged in said seats to normally separate said driven member, clamping bolts having slotted heads arranged through said driven members, the inner driven members being provided with seats for the heads of said bolts, adjusting nuts on the outer ends of said bolts, actuating levers pivoted in said slotted bolt heads and having lug-like fulcrums engaging the inner side of the inner clutch member, an actuating sleeve slidably mounted on said shaft and said driving member hub to slidably embrace said levers, and means for adjusting said actuating sleeve.

2. In a clutch, the combination of a driving shaft, a driving clutch disk provided with a sleeve-like hub fixed to said shaft, a pulley having an internal annular shouldered rib provided with inwardly projecting lugs, an inner driven clutch member seated in said shoulder of said rib and rotatably mounted on said hub to coact with said driving clutch disk, screws for securing said inner driven clutch member to said pulley arranged through said inwardly projecting lugs and threaded into said inner driven clutch member, the inner ends of the screw holes being counterbored to provide spring seats, an outer driven clutch member rotatably mounted on said hub to coact with said driving clutch member and having an annular inwardly projecting flange embracing the edge thereof, said flange having spring seats therein disposed oppositely to said spring seats of said inner driven clutch member, coiled springs arranged in said seats to normally separate said driven member, clamping bolts having slotted heads arranged through said driven members, the inner driven members being provided with seats for the heads of said bolts, adjusting nuts on the outer ends of said bolts, actuating levers pivoted in said slotted bolt heads and having lug-like fulcrums engaging the inner side of the inner clutch member, an actuating sleeve slidably mounted on said shaft and said driving member hub to slidably embrace said levers, and means for adjusting said actuating sleeve.

3. In a clutch, the combination of a driving shaft, a driving clutch disk provided with a sleeve-like hub fixed to said shaft, a pulley having an internal annular shouldered rib provided with inwardly projecting lugs, an inner driven clutch member seated in said shoulder of said rib and rotatably mounted on said hub to coact with said driving clutch disk, screws for securing said inner driven clutch member to said pulley arranged through said inwardly projecting lugs and threaded into said inner driven clutch member, an outer driven clutch member rotatably mounted on said hub to coact with said driving clutch member, clamping bolts having slotted heads arranged through said driven members, the inner driven members being provided with seats for the heads of said bolts, adjusting nuts on the outer ends of said bolts, actuating levers pivoted in said slotted bolt heads and having lug-like fulcrums engaging the inner side of the inner clutch member, an actuating sleeve slidably mounted on said shaft and said driving member hub to slidably embrace said levers, and means for adjusting said actuating sleeve.

4. In a clutch, the combination of a driving shaft, a driving clutch disk provided with a hub fixed to said shaft, an inner driven clutch member rotatably mounted on said hub to coact with said driving clutch disk, an outer driven clutch member rotatably mounted on said hub to coact with said driven clutch member and having an annular inwardly projecting flange embracing the edge thereof, clamping bolts arranged through said driven members, adjusting nuts for said bolts, actuating levers pivoted on said clamping bolts and having fulcrums engaging the inner side of the inner clutch member, an actuating sleeve slidably mounted on said shaft and said driving member hub to slidably embrace said levers, a pulley secured to one of said driven members, and means for adjusting said actuating sleeve.

In witness whereof, I have hereunto set my hand and seal in the presence of two witnesses.

WILLIAM KROMDYK, Jr. [L. S.]

Witnesses:
LUELLA G. GREENFIELD,
MARGARET L. GLASGOW.

Copies of this patent may be obtained for five cents each, by addressing the "Commissioner of Patents, Washington, D. C."